United States Patent

Oberrecht

[11] Patent Number: 5,273,071
[45] Date of Patent: Dec. 28, 1993

[54] DRY DISCONNECT COUPLINGS
[75] Inventor: David A. Oberrecht, Cincinnati, Ohio
[73] Assignee: Dover Corporation, New York, N.Y.
[21] Appl. No.: 846,055
[22] Filed: Mar. 5, 1992
[51] Int. Cl.⁵ .............................................. F16L 37/28
[52] U.S. Cl. .................................. 137/614.06; 251/357
[58] Field of Search ........................ 137/614.02, 614.04, 137/614.05, 614.01, 614.06; 251/149.9, 360, 357

[56] References Cited
U.S. PATENT DOCUMENTS

| | | | |
|---|---|---|---|
| 2,678,187 | 5/1954 | Peters | 251/357 |
| 3,217,746 | 11/1965 | Voisine | 137/614.04 |
| 3,310,283 | 3/1967 | Carlton | 251/357 |
| 4,030,524 | 6/1977 | McMath et al. | 137/614.06 |
| 5,078,170 | 1/1992 | Henry | 137/614.06 |

Primary Examiner—Martin P. Schwadron
Assistant Examiner—Kevin L. Lee
Attorney, Agent, or Firm—Kinney & Schenk

[57] ABSTRACT

A dry disconnect coupling comprises an adapter connected to a liquid conduit and a coupler connected to another liquid conduit. The adapter and coupler each have poppets which seal passageway outlets thereof when they are disconnected. When connected, means are provided for simultaneously opening the poppets by displacing them with their end faces in contiguous relation. An O-ring, mounted in a groove in the end face of the coupler poppet sealingly engages the end face of the adapter poppet to prevent wetting of the end face surfaces of the poppets and thereby minimize liquid which could be a source of liquid when the coupler is disconnected from the adapter. Six alternate sealing rings, for providing an end face seal, are described.

33 Claims, 4 Drawing Sheets

DRY DISCONNECT COUPLINGS

The present invention relates to improvements in dry disconnect couplings.

So-called dry disconnect couplings are employed in a wide variety of applications to provide a disconnectable connection between liquid conduits. These couplings comprise an adapter mounted on one conduit and a coupler mounted on another conduit. Means are provided for mechanically locking the coupler and adapter in coupled relation. The adapter and coupler each have flow passageways which are sealed by poppets when they are uncoupled. When coupler and adapter are locked in coupled relation, the poppets are opened to permit flow of liquid. When the coupler and adapter are separated, the poppets close to prevent flow of liquid. A dry disconnect connector of this type is disclosed in U.S. Pat. No. 4,030,524, issued to Jack Alan McMath and of common assignment with the present application.

While prior dry disconnect couplings, of this type, are effective in minimizing spillage of liquid when they are disconnected, nonetheless there is a small amount of liquid which is lost each time a disconnection is made. In many cases, this loss of liquid is of no consequence. However, for example, where the liquid is a petroleum product, or other product which is a potential source of contamination, particularly one which does not readily evaporate, the lost liquid can be an undesirable source of contamination.

Present dry disconnect couplings are reasonably effective. For example, a dry disconnect coupling (as referenced above) for a four inch conduit can limit the loss of liquid to something in the order of ⅜ ounce for each disconnection. In any installation where connections and disconnections are made on a continuing, repetitive basis, this small amount of lost liquid can create a soil contamination hazard, even where the coupler and adapter are wiped with a rag to minimize the liquid falling to the ground. An example of this hazard is found in loading tank cars with fuel oil at a storage tank farm, where dry disconnect couplings are employed in connecting the tank cars to storage tanks. Even with the best of efforts, the loss of ⅜ ounce of fuel (or similar amount) upon each disconnection, can result in potentially hazardous soil contamination over an extended period of use.

Accordingly, the object of the present invention is to minimize the amount of liquid lost upon disconnection of a dry disconnect coupling to the end of providing a coupling which more closely approaches a true "dry disconnect".

A further object of the invention is to minimize such loss of liquid by means which economically accommodate manufacturing tolerances for fabricating the components of the coupling.

These ends are broadly attained by a dry disconnect coupling comprising a coupler and an adapter. The coupler has a coupler passageway and a coupler poppet for controlling liquid flow through the coupler passageway. The adapter has an adapter passageway and an adapter poppet for controlling liquid flow through the adapter passageway. The poppets are in closed positions when the coupler and adapter are uncoupled.

The coupler has means for mechanically locking the coupler and adapter in coupled relation with end faces of the poppets in opposed, contiguous relation. The coupler also includes means for displacing the poppets to open positions in which liquid flows through the coupler and adapter passageways. The end of minimizing loss of liquid upon disconnection of the coupler is provided by means for preventing the major portions of the opposed end faces of the poppets from being wetted by liquid when they are in contiguous relation and displaced to open positions.

The means for preventing the major portions of the opposed end faces of the poppets from being wetted comprise face sealing means disposed between the end faces of the poppets. Further, it is preferred to provide an annular seal between the coupler and the adapter adjacent to and outwardly of the poppets. This outer seal is effective when the coupler and adapter are in coupled relation. The outer annular seal limits the surfaces of the coupler which are wetted by liquid.

The face sealing means are, preferably mounted on the coupler poppet.

In one embodiment, the face sealing means comprise an annular, dovetail groove formed in the end face of one of the poppets. An elastomeric O-ring is captured in this groove and projecting outwardly of the end face of the poppet on which it is mounted, when the coupler and adapter are uncoupled. The elastomeric O-ring resiliently and sealingly engaging the walls of the dovetail groove and the end face of the other poppet in the coupled relation of the coupler and adapter.

Other embodiments of the invention teach the use of alternate sealing rings including a sealing ring having an arch shaped cross section; a sealing ring which defines the outer periphery of the poppet on which it is mounted; a sealing ring having an annular sealing rib and a modification thereof in which the sealing rib is in the form of a curved lip; a sealing ring comprising a ring having a U-shaped cross section and a garter having an elastomeric sealing layer, with spring means acting against the rigid member to effect a seal with the opposed poppet.

The objects of the invention may also be attained by a coupler adapted to be mechanically locked in coupled relation to an adapter having a liquid passageway of circular cross section terminating in a circular opening in an end portion thereof. Such adapters also comprise a poppet for sealing the outer end of the adapter passageway and spring means urging the adapter outwardly thereof to a sealing position. The adapter poppet is axially displaceable, in response to a force on the outer end face thereof, against the force of the spring means, to an open position, inwardly of the adapter.

This coupler comprises a liquid passageway of circular cross section. The coupler has an end portion generally normal to the axis of coupler passageway and a circular outlet opening in the end portion. The coupler further includes a poppet also having a circular cross section and an outer face normal to the axis to the passageway. A valve seat is formed peripherally of the outlet opening of the coupler, with means positioning the coupler poppet in a sealing position in engagement with the valve seat.

Means are provided for mechanically connecting the coupler to an adapter with the poppets thereof in aligned relation and with their end faces in contiguous relation. Means are provided for then displacing the coupler poppet to an open position outwardly of the seat to thereby simultaneously open the poppet of the adapter.

The object of minimizing loss of liquid is attained by face sealing means provided on the outer face of the coupler poppet adjacent the outer periphery thereof. Thus, when the coupler poppet is displaced to an open position, it will displace the adapter poppet to an open position and the face seal means will prevent liquid from wetting the major portions of the end faces of the poppets, thereby minimizing contamination from liquid when the coupler is disconnected from the adapter.

Further features of the invention are found in providing sealing rings, as referenced above, on the coupler poppet.

The above and other related objects and features of the invention will be apparent from a reading of the following disclosure which includes a description of an preferred embodiment of the invention and alternate embodiments thereof, with reference to the accompanying drawings and the novelty thereof pointed out in the appended claims.

Figure 1:
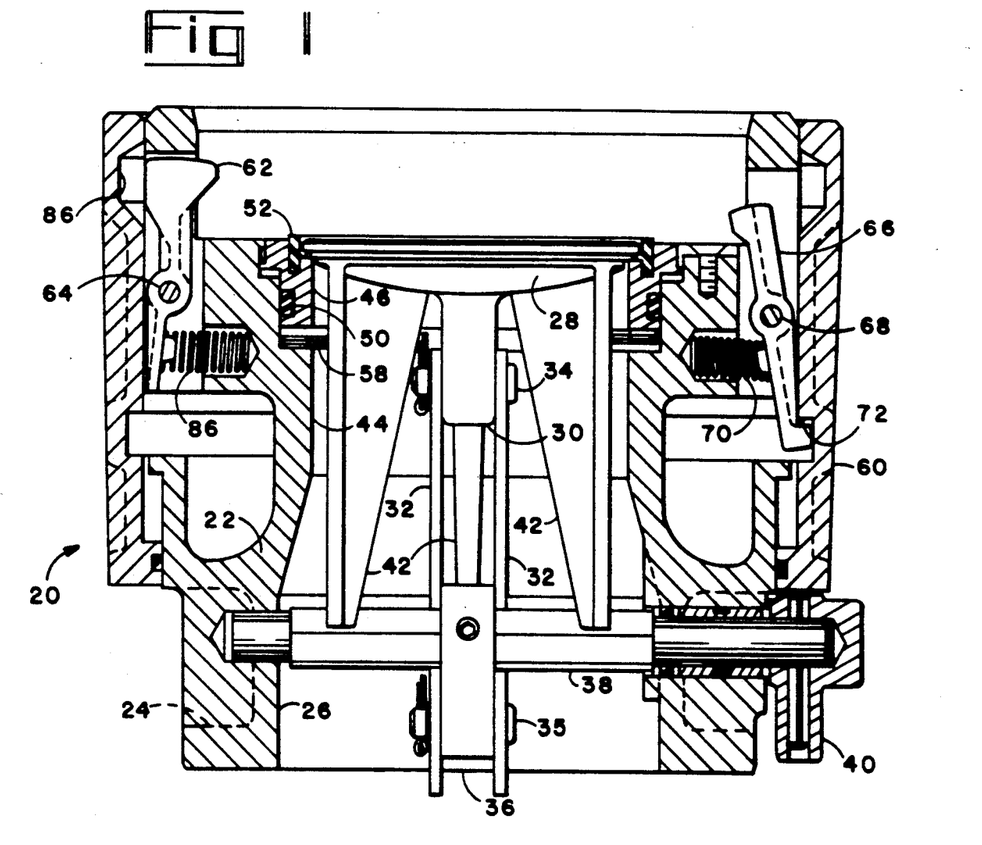
FIG. 1 is an elevation, in longitudinal section, of a dry disconnect coupler embodying the present invention.

Referencing first FIG. 1, the coupler of the present invention is indicated generally by reference character 20. This coupler comprises a body 22 having a flange 24 by which it may be mounted on a liquid conduit (not shown). The body 22 defines a central liquid passageway 26, of generally circular cross section, which is registered with the passageway of the conduit on which the coupler 20 is mounted.

Flow of liquid through the passageway 26 is controlled by a poppet 28, which has a central stem 30 to which links 32 are attached by a pin 34. The opposite ends of the links 34 are connected, by a pin 35, to a drive link 36 which is mounted in locked angular relationship on a transverse shaft 38. The shaft 38 is journaled on the body 22, with one end extending to the exterior thereof. An operating lever 40 is mounted on the end of shaft which projects beyond the body 22.

The poppet has three longitudinally extending guide legs, 42 which engage the surface of a cylindrical portion 44 of the body passageway 26 and guide the poppet for axial movement relative to the passageway 26. The upper end of the passageway 26 is defined by a seal cylinder 46 which is received in a bore 48 formed in the upper end of the body 22. An O-ring 50 provides a seal between the cylinder 46 and the bore 48.

Figure 2:
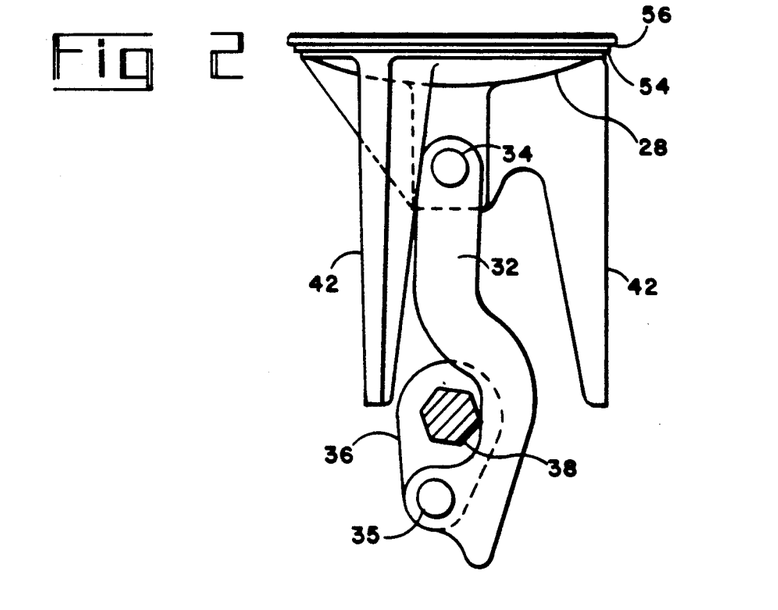
FIG. 2 is a section taken on line 2—2 in FIG. 1 showing a poppet and actuating mechanism therefor.

A sealing ring 52, having a T-shaped cross section, is mounted on the cylinder 46 and provides a seat for the poppet 28 in the closed position of the poppet, illustrated in FIG. 1. More specifically, the poppet 28 has spaced annular surfaces 54, 56 (FIG. 2). A wave spring 58 urges the cylinder 46 outwardly to a position limited by engagement with the annular surface 54. The annular surface 56 then compresses the projecting leg of the sealing ring 52 against the underlying portion of the cylinder 46, with the extent to which the sealing ring is compressed being limited by the axial spacing between the annular surfaces 54, 56.

The coupler 20 also includes means for making connection with an adapter. These means comprise a sleeve 60 which is axially slidable relative to the body 22. Cam arms 62 (typically three) are pivotally mounted on the body 22, by pins 64, to mechanically lock the coupler to the adapter, as will be described shortly.

The sleeve 60, in its lower position, also prevents rotation of the lever 40 to prevent opening of the poppet 28, if the coupler is not attached to an adapter. To this end, an interlock lever 66 is pivotally mounted on a shaft 68. Spring 70 urges the lower end of interlock lever 66 into engagement with a groove 72 on the interior surface of sleeve 60 to prevent the sleeve from being raised, unless the coupler is initially mated with an adapter.

Figure 3:
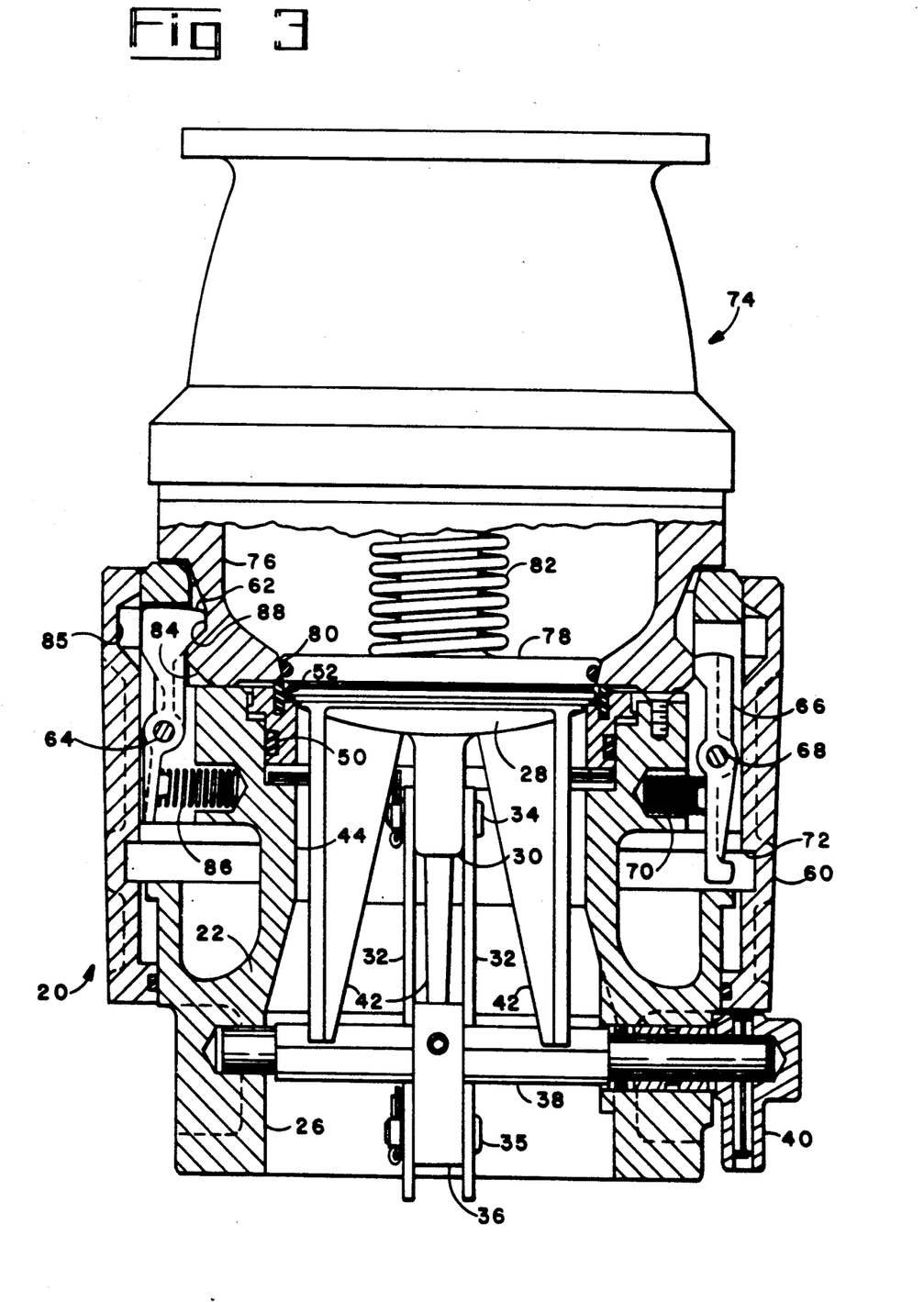
FIG. 3 is an elevation illustrating the coupler of FIG. 1 positioned for connection with an adapter.

FIG. 3 illustrates an adapter 74 positioned (initially mated) for connection with the coupler 20. The adapter 74 is mounted on a second liquid conduit and comprises a flow passage 76, the outer end of which is normally sealed by a poppet 78. The poppet 78 is guided for axial movement relative to the passageway 76 and urged into engagement with a conical seat 80 by a spring 82.

The adapter has a conical outer end 84 which cams the cam arms 62 outwardly as the adapter is positioned with its outer face contiguous with the outer face of the coupler 20. The sleeve 60 is relieved by a circumferential groove 85 to permit the cam arms to swing outwardly. When so positioned, springs 86, acting on the cam arms 62, cause the cam arms to engage a groove 88 formed in the adapter. Also, at this time, the interlock lever 66 has been pivoted so that its lower end is clear of the groove 72. Thus the sleeve 60 is free to be raised to its locking position seen in FIG. 4.

In the locked position (FIG. 4), the cam arms 62 are positively held in locked relation with the adapter groove 88 by the sleeve 60. In this mechanically locked position, a liquid seal is provided between the coupler 20 and the adapter 74 by the outer annular surface of sealing ring 52 which engages the outer face of the adapter 74, peripherally of the circular opening for the valve seat 80.

Figure 4:
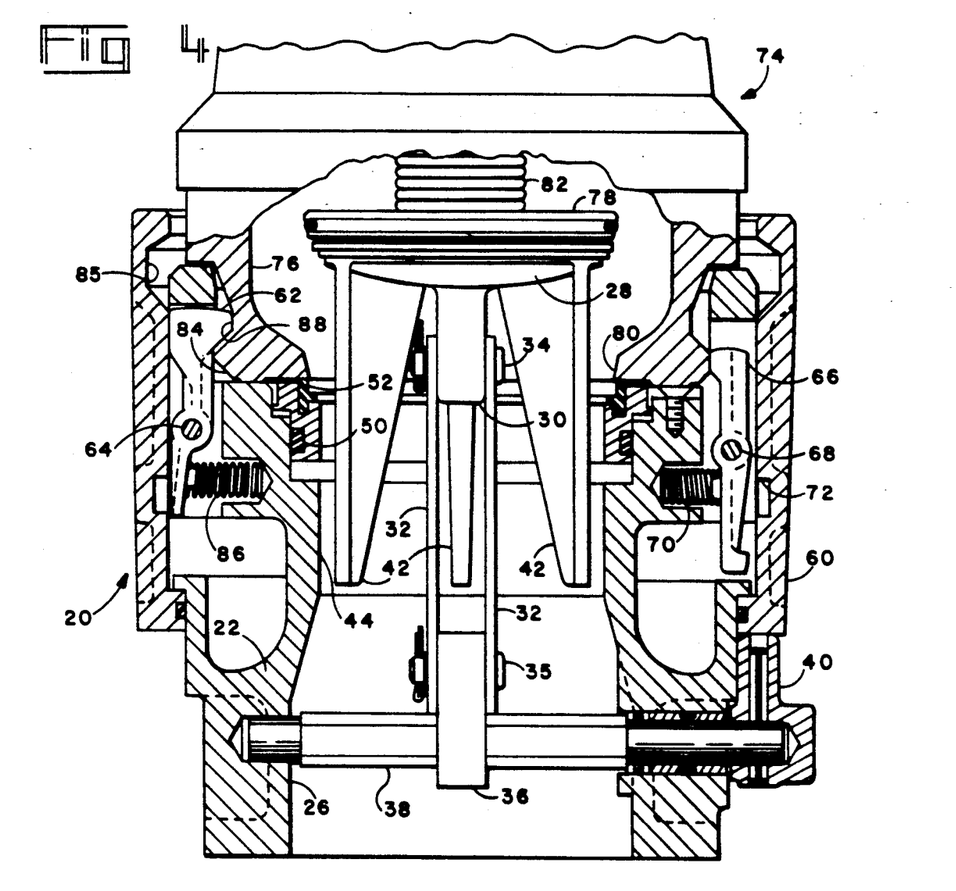
FIG. 4 is an elevation similar to FIG. 3 showing the coupler and adapter connected for flow of liquid therebetween.

It will also be noted that when the coupler 20 and adapter 74 are thus locked in coupled relation, the poppets 28 and 78 are axially aligned with their outer end faces in opposed contiguous relation.

With the sleeve 60 in its raised position (FIG. 4), the lever 40 is free to be swung to displace the poppet 28 outwardly of the sealing ring 52 (by rotating the shaft 38 approximately 180° from the position of FIG. 3). As the poppet 28 is so displaced, it displaces the poppet 78 so that both poppets are opened substantially simultaneously for flow of liquids between the passageways 26 and 76, as indicated in FIG. 4.

Prior to opening of the poppets 28 and 78, a liquid seal is provided between their opposed end faces. To this end, an annular, dovetail groove 90 (FIG. 4) is formed in the outer, end face of the poppet 28. An O-ring 92 is disposed in the groove 90. The O-ring 92 is formed of rubber, or any elastomeric material that is resilient and not unduly degraded by petroleum products, or is compatible with the liquids being transmitted through the coupler and adapter. The O-ring 92 has a diameter permitting is to be displaced through the opening to the dovetail slot and then expand so that it is retained therein.

Figure 5:
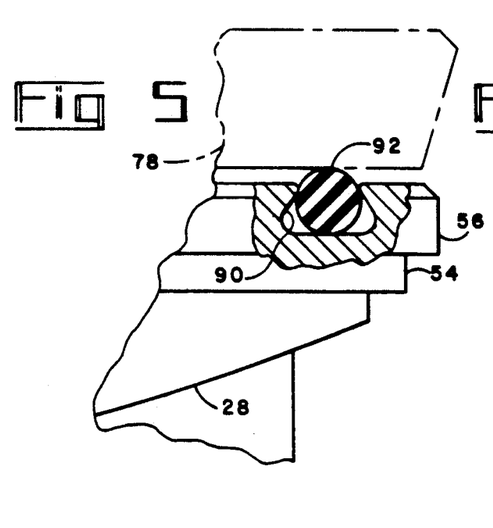
FIG. 5 is a fragmentary view, on an enlarged scale and with portions broken away, of a poppet valve and seal employed in the coupler.
Figure 6:
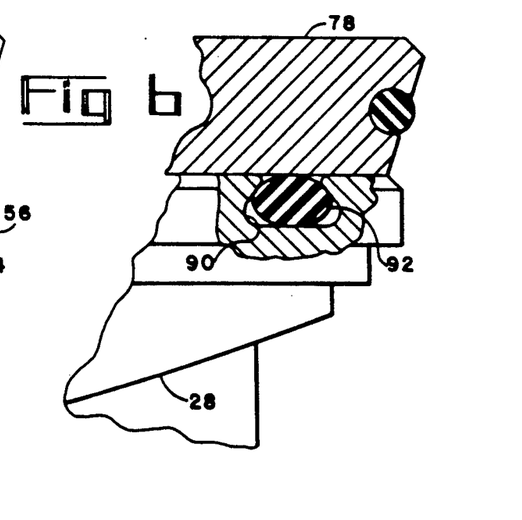
FIG. 6 is a fragmentary view of the seal of FIG. 5 in its sealing relation with the poppet of an adapter.

During connection of the coupler 20 and adapter 74, the poppet 78 is positioned as indicated by the phantom showing in FIG. 5. As the cam arms 62 are brought to their locking positions of FIG. 4, the poppet 78 may engage the O-ring 92 and compresses it to the configuration illustrated in FIG. 6. Thus an annular face seal is obtained between the O-ring 92 and the poppet 78. Further, an effective seal is obtained between the O-ring 92 and the poppet 28, at the three points of contact between the O-ring 92 and the dovetail groove 90. Alternatively, when the coupler 20 and adapter 74 are locked (FIG. 4) by displacement of the sleeve 60, the sealing arrangement of FIG. 6 may not be fully attained. In this case, such sealing arrangement will be attained when the valve 28 is displaced by rotation of the lever 40. The important think is that the sealing arrangement (FIG. 6) is obtained before the poppets 28 and 78 are opened.

The provision of this face seal effectively prevents liquid from wetting the end faces of the poppets 28 and 78 when the coupler is connected to the adapter for the flow of liquid therebetween. When the coupler is disconnected from the adapter, the lever 40 is first rotated to the position of FIGS. 1 and 2, to close the poppets 28, 78. The passageways 26, 76 of the coupler and the adapter are again sealed. Thereafter, the sleeve 60 is lowered to mechanically disconnect the coupler from the adapter. It will be apparent that only the minimal amount of liquid that wetted the annular surfaces between the sealing ring 52 and the sealing ring 92 could be the source of contamination. These surfaces may be wiped with a rag so that no liquid escapes to contaminate the soil when the coupler is disconnected from the adapter.

It will thus be apparent that it is preferred that the annular face seal, i.e., the O-ring 92, be closely spaced from the outer periphery of the poppets 28 and 78. It will also be seen that the poppet 28, passes through the opening of valve seat 80. Theoretically the diameter of the poppet 28 could be the same diameter as the poppet 74, but, in practice is slightly less than that diameter, in order to freely pass through the opening for the valve seat 88.

At this point it will be noted that couplers and adapters of the present type are not precision instruments. This is to say that manufacturing tolerances are such that there can be fairly substantial deviations of the end faces of the poppets 28 and 78 from a normal relation to their axes. Thus, these end faces may not lie in true parallel planes when in contiguous relation. The O-ring 92 provides an effective seal with the outer end surface of the adapter poppet 78 even though some portions of the end faces of the poppets may be spaced apart when there is contact between other portions.

Wetting of the outer end faces of the poppets are thus prevented when the coupler 20 is connected to the adapter 74 and the poppets 28 and 78 are opened for flow of liquid.

The coupler 20 is disconnected from the adapter 74 by first rotating the lever to the position of FIG. 3 to bring the poppets 28 and 78 to their closed positions. The end face seal provided by the O-ring 92 maintains its effectiveness during this closing movement of the poppets so that their end faces continue to be sealed from liquid. After the poppets are closed, the sleeve 60 is then lowered to the position of FIG. 1, permitting the adapter 74 to be disengaged from the coupler 20.

It will be apparent that the only surfaces of the coupler 20 and adapter 74 which have been wetted by liquid during delivery of liquid through this coupling, are those forming the narrow annular band between the seal 52 and the O-ring 92. Liquid which could be a source of contamination is thus reduced to a minimum and the described structure closely approaches a true "dry disconnect" coupling.

Figure 7:
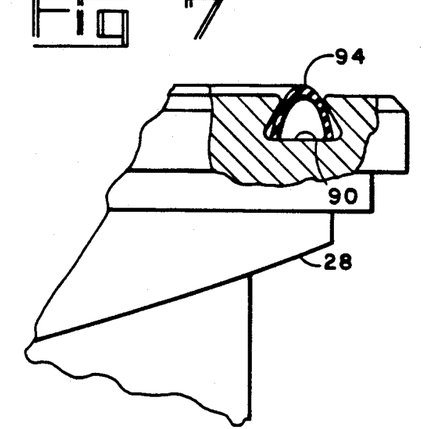
FIG. 7 is a view similar to FIG. 5 illustrating another embodiment of the invention.

Reference is next made to FIG. 7 for a description of an alternate embodiment of the invention in which a sealing ring 94 is substituted for the O-ring 92 in the dovetail groove 90 of the poppet 29. The sealing ring is, likewise, formed from a resilient, elastomeric material, Viton being an illustrative material.

The sealing ring 94 has an arch cross section comprising curved legs joined at an apex. This sealing ring is captured in the groove 90 by the curved legs, which extend beneath the undercut portions of the groove 90. The apex of the arch cross section projects outwardly of the end face of the poppet 28. When the coupler 20 and adapter 74 are connected, the apex portion of the sealing ring 94 sealingly engages the end face of the poppet 78 and the legs of the arch cross section sealingly engage the groove 90 to prevent wetting the major portions of the end faces of the poppets 28 and 78, in the same fashion as the O-ring 92.

Figure 8:
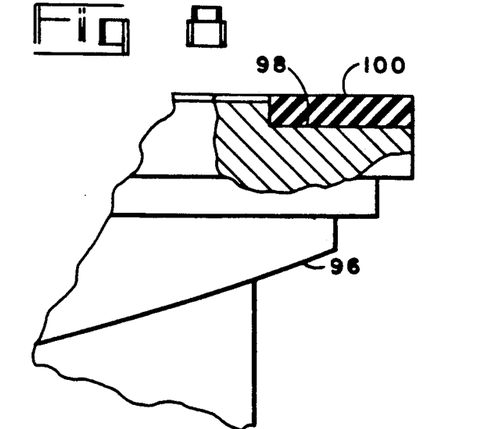
FIG. 8 is a view similar to FIG. 5 illustrating another embodiment of the invention.

FIG. 8 illustrates another means for sealing the end faces of the poppets to prevent wetting. A coupler poppet 96 is identical with the previously described poppet 28, excepting that the groove 90 has been eliminated and the outer peripheral portion of the end face has been relieved to form an annular seat 98 for a sealing ring 100. The sealing ring 100 may be formed of the same elastomeric material as the previously described sealing rings.

The sealing ring 100, preferably, has a rectangular cross section and is mounted to the seat 98, as by bonding. The planar outer, sealing surface of the ring 100 defines the outer periphery of the end face of the poppet 96. This sealing surface is disposed outwardly from the end face of the poppet 96 so that it will be compressed into sealing engagement with the adapter poppet 78 marginally of the periphery thereof. This arrangement maximizes the portions of the end faces of the end faces of the poppets which are protected against wetting.

Figure 9:
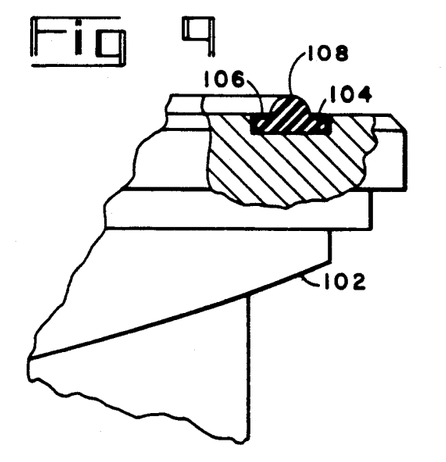
FIG. 9 is a view similar to FIG. 5 illustrating another embodiment of the invention.

FIG. 9 illustrates a further embodiment of end face sealing means comprising a modified coupler poppet 102 which may be identical with the poppet 28 except for the face sealing means. An annular groove 104, of rectangular section, is formed in the end face of the poppet 102. A sealing ring 106 is mounted in the groove 104, as by bonding. The sealing ring 106 is, likewise, formed of a resilient, elastomeric material and has a rectangular cross section received in the groove 104. An annular sealing rib 108 projects from the outer surface of rectangular cross section of the ring 106, beyond the outer surface of the end face of the poppet 102.

When the poppet 102 is moved into engagement with the poppet 78, in the manner previously described, the annular sealing rib 108 sealingly engages the end face of the poppet 78 to protect against wetting of the end faces of the poppets. The rib 108 provides a greater sealing effectiveness where there are pronounced surface irregularities in the end face of the poppet 78.

Figure 10:
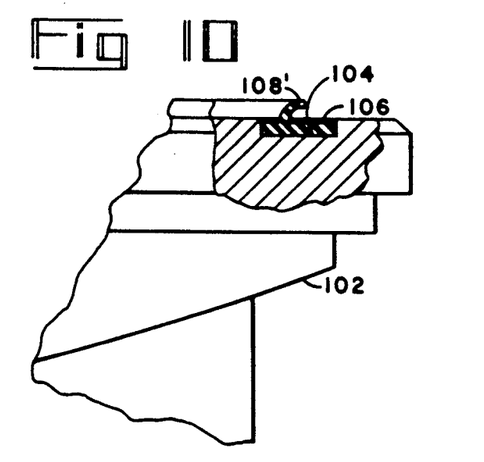
FIG. 10 is a view similar to FIG. 5 illustrating another embodiment of the invention.

FIG. 10 illustrates an end face sealing means which represents a modification of the embodiment of FIG. 9, with like components being indicated by the same reference characters. The sealing rib 108' differs from the sealing rib 108 in that, in cross section, it is in the form of an outwardly curved lip.

Figure 11:
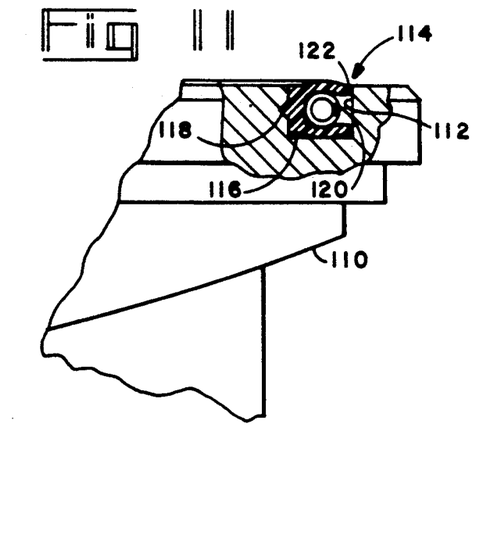
FIG. 11 is a view similar to FIG. 5 illustrating another embodiment of the invention.

FIG. 11 illustrates still another embodiment of face sealing means. In this embodiment a coupler poppet 110 also corresponds in function to the poppet 28, excepting for the face sealing means. A rectangular groove 112 is formed in the end face of the poppet 110. A compositely formed sealing ring 114 is disposed in the groove 112. The sealing ring 114 comprises a ring 116 of U-shaped cross section having legs extending outwardly from a central bridge. The bridge has a rib 118 which is received in a circumferential groove in the inner side wall of the annular groove 112 to retain the sealing ring 114 therein. The outer leg of the ring 116 is bowed outwardly beyond the outer end face of the poppet 110 to provide a sealing surface for engagement with the coupler poppet 78. A garter spring 120 is disposed between the legs of the U-shaped cross section of the ring 116.

The bowed surface of the leg of the U-shaped cross section ring resiliently engages the coupler poppet 78. This resilient action is a combination of deflection of the leg of the ring 116 and deflection of the spring 120. It is preferred that the ring 116 be formed of polytetraflouroethylene (Teflon). The sealing ring 114, in this form, is available as a commercial item. The sealing ring 114 provides a relatively long service life and is particularly advantageous where the finish of the end face of the poppet 78 is relatively smooth and true.

It is further preferred that caulking 122 be provided in the groove 112 and the outer leg of the ring 116. This caulking is provided to preventing liquid from entering the groove 120 and becoming a source of contamination when the coupler is separated from the adapter. Silicon caulking compound, as used in caulking bath tubs provides an effective seal and yet has sufficient flexibility so that the effectiveness of the sealing ring 114 is not adversely affected.

Figure 12:
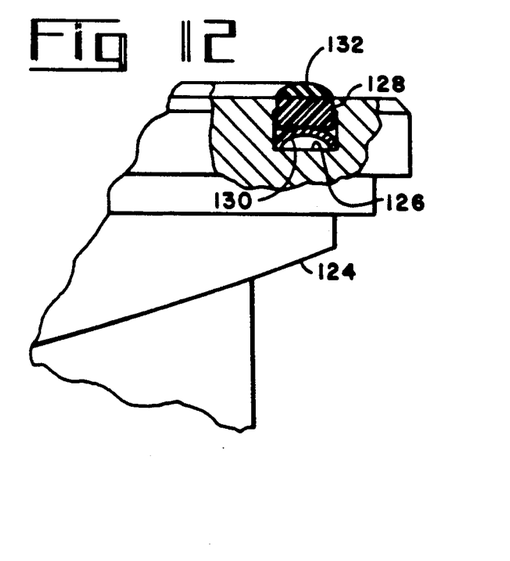
FIG. 12 is a view similar to FIG. 5 illustrating another embodiment of the invention.

FIG. 12 illustrates the final embodiment of the invention. A poppet 124 may be the same as poppet 28 except for the end face sealing means provided. An annular groove 126 is formed in the end face of the poppet 124. A resinous (plastic) ring member 128 is slidably mounted in the groove 126 for limited movement axially of the poppet 124. The groove 126 has under cut ledges and the ring 128 has shoulders which engage these ledges to retain the ring 128 in the groove 126. The ring 128 is formed of a relatively rigid plastic material which, nonetheless, is sufficiently resilient and flexible to permit assembly of the ring 126 in the groove 126. Delrin is a suitable material. The inner end of the ring is tapered so that the ring shoulders may be telescoped through the narrow entrance to the slot 126 and then snap back to engage the slot ledges.

A spring member 130, disposed between the bottom of the groove 126 and the ring 128, resiliently urges the ring 128 outwardly of the end face of the poppet 124. A layer of elastomeric material 132 is mounted, as by bonding, on the outer surface of the ring 128. The elastomeric layer is disposed beyond the end face of the poppet 124 to engage the adapter poppet 78 and provides an end face sealing function for the same purposes as the other sealing rings previously described.

In connection with the several sealing rings herein described, it has been pointed out that the portion which engages the adapter poppet (78) projects beyond the end face of the coupler poppet (28). It is to be recognized that an annular rib could be integrally formed to protrude from the end face of the adapter poppet. This annular rib could then project inwardly to sealingly engage a sealing ring which did not project beyond the end face of the coupler poppet. Such an alternate arrangement would, for example, be applicable to the embodiment of FIG. 8. Any alternate construction of this type would be the structural and functional equivalent of having the sealing portion of the sealing ring project beyond the end face of the coupler poppet.

It will also be appreciated that, in accordance with the broader objects of the invention, the sealing rings herein described could be mounted on the adapter poppet (78) for sealing engagement with the coupler poppet (28).

Other variations from the specific embodiments, herein disclosed, within the spirit and scope of the present inventive concepts which are set forth in and defined by the following claims.

Having thus described the invention, what is claimed as novel and desired to be secured by Letters Patent of the United States is:

1. A dry disconnect coupling comprising
   a coupler having
   a coupler passageway and
   a coupler poppet for controlling liquid flow through the coupler passageway,
   an adapter having
   an adapter passageway and
   an adapter poppet for controlling liquid flow through the adapter passageway,
   said poppets being normally in closed positions when the coupler and adapter are uncoupled,
   means for
   mechanically locking the coupler and adapter in coupled relation, to form the outer bounds of a passage for the flow of fluid between the adapter and the coupler, while the adapter poppet and the coupler poppet remain in their closed positions and with end faces of the poppets in opposed, contiguous relation and for
   selectively displacing said poppets between said closed positions and open positions in which liquid flows around the opposed contiguous end faces of said poppets and through said coupler and adapter passageways, said poppets being maintained in contiguous relation as they are displaced between their open and closed positions, and
   face sealing means for preventing the major portions of the opposed end faces of the poppets from being wetted by liquid when they are in contiguous relation and displaced between their closed and open positions,
   said face sealing means comprising resilient, annular means mounted on the end face of one of said poppets adjacent the outer bounds of said end faces and closely adjacent the flow of liquid therearound.

2. A dry disconnect coupling as in claim 1 further comprising
an annular seal between the coupler and the adapter, said outer seal being adjacent to and outwardly of the poppets and effective when the coupler and adapter are in coupled relation,
said outer annular seal being spaced outwardly from the face sealing means and limiting the surfaces of the coupler which are wetted by liquid.

3. A dry disconnect coupling as in claim 2 wherein the face sealing means are mounted on the coupler poppet.

4. A dry disconnect coupling as in claim 1 wherein the face sealing means comprise
an annular, dovetail groove formed in the end face of one of said poppets, and
an elastomeric O-ring captured in said groove and projecting outwardly of the end face of said one poppet when the coupler and adapter are uncoupled,
said O-ring resiliently and sealingly engaging the walls of the dovetail groove and the end face of the other poppet in the coupled relation of the coupler and adapter.

5. A dry disconnect coupling as in claim 1 wherein the face sealing means comprise
an annular, dovetail groove formed in the end face of one of said poppets, and
an elastomeric, sealing ring having an arch cross section comprised of curved legs joined at an apex, said sealing ring being captured in said groove by the curved legs which extend beneath undercut portions of the groove with the apex projecting outwardly of the end face of the said one poppet when the coupler and adapter are uncoupled,
said sealing ring resiliently and sealingly engaging the walls of the dovetail groove and the end face of the other poppet in the coupled relation of the coupler and adapter.

6. A dry disconnect coupling as in claim 1 wherein the face sealing means is effective to the periphery of one of said poppets.

7. A dry disconnect coupling as in claim 6 wherein the face sealing means comprise
an annular seat formed by a relief marginally of the periphery of one of said poppets, and
an elastomeric sealing ring seated on said annular seat,
said sealing ring projecting outwardly of the end face of said one poppet when the coupler and adapter are uncoupled,
said sealing ring resiliently and sealingly engaging said annular seat and the end face of the other poppet in the coupled relation of the coupler and adapter.

8. A dry disconnect coupling as in claim 1 wherein the face sealing means comprise
an annular groove formed in the end face of one of said poppets, and
an elastomeric sealing ring mounted in said groove and sealingly engaging the end face of the other poppet when the adapter and coupler are locked in coupled relation.

9. A dry disconnect coupling as in claim 8 wherein the sealing ring has a rectangular cross section and an outer face and an annular rib projecting from the outer face for sealing engagement with said other poppet.

10. A dry disconnect coupling as in claim 9 wherein the outer face is disposed inwardly of the end face of one poppet and said annular rib projects outwardly of said end face.

11. A dry disconnect coupling as in claim 10 wherein said annular rib is in the form of a curved lip.

12. A dry disconnect coupling as in claim 2 wherein the face sealing means comprise
an annular groove formed in the end face of one of said poppets,
a sealing ring, mounted in said groove, said sealing ring having a generally U-shaped cross section including first and second legs connected by a bridge,
further characterized in that
said legs project radially outwardly and
the first leg is generally parallel to the end face of one of said poppets and bowed outwardly to project therebeyond for engagement with the end face of the other poppet.

13. A dry disconnect coupling as in claim 12 wherein the sealing ring is formed of a polytetraflouroethylene resin and
further including
a coil spring disposed between the legs of the sealing ring.

14. A dry disconnect coupling as in claim 13 further including
means for providing a seal between said sealing ring and said groove to prevent liquid from collecting in said groove.

15. A dry disconnect coupling as in claim 1 wherein the face sealing means comprises
an annular groove formed in the end face of one of said poppets,
an annular ring mounted in said groove for axial movement relative thereto,
spring means, disposed between said annular ring and the bottom of said groove, for yieldingly urging said annular ring outwardly of the end face of said one poppet,
said annular ring having, on its outer annular face, a layer of elastomeric material for sealing engagement with the end face of the other poppet.

16. A dry disconnect coupler adapted to be mechanically locked in coupled relation to an adapter having a liquid passageway of circular cross section terminating in a circular opening in an end face thereof, a poppet for sealing the outer end of the adapter passageway, and spring means urging the adapter poppet outwardly thereof to a sealing position, said adapter poppet being axially displaceable, in response to a force on the outer end face thereof, against the force of said spring means, to an open position, inwardly of the adapter,
said coupler comprising
a liquid passageway of circular cross section,
said coupler having an end portion generally normal to the axis of said passageway,
a circular outlet opening in said end portion,
a coupler poppet also having a circular cross section and an outer face normal to the axis to said passageway,
a valve seat formed peripherally of said outlet opening,
means, for positioning said coupler poppet in a closed position in sealing engagement with said valve seat, means for mechanically connecting said coupler to an adapter with said poppets in aligned relation and with their end faces in contiguous relation, and means for displacing the coupler poppet to an open position outwardly of said seat when the coupler is connected to an adapter to thereby simultaneously open the poppet of the adapter, characterized by face sealing means for preventing the major portions of the opposed end faces of the poppets from being wetted by liquid when they are in contiguous relation and displaced between their closed and open positions, said face sealing means comprising resilient, annular means mounted on the end face of one of said poppets adjacent the outer bounds of said end faces and closely adjacent the flow of liquid therearound, whereby, when the coupler poppet is displaced to an open position, it will displace the adapter poppet to an open position and the face seal means prevent liquid from wetting the major portions of the end faces of the poppets, thereby minimizing contamination from liquid when the coupler is disconnected from the adapter.

17. A dry disconnect coupler as in claim 16 wherein
the coupler poppet has an annular groove formed in its end face and
the face sealing means comprise
an elastomeric sealing ring, mounted in said groove, for sealingly engaging the end face of the adapter poppet.

18. A dry disconnect coupler as in claim 17 wherein
the sealing ring has a portion projecting outwardly of the end face of the coupler poppet for engagement with the adapter poppet, and
the force of the spring acting on the adapter poppet is sufficient to compress the sealing ring a distance sufficient for direct contact between the end faces of the coupler poppet and the adapter poppet.

19. A dry disconnect coupler as in claim 17 wherein
the annular groove has a dovetail cross section, and
the sealing ring is an O-ring, captured in said groove and projecting outwardly of the end face of the coupler poppet when the coupler and adapter are uncoupled,
said O-ring resiliently and sealingly engaging the walls of the dovetail groove and the end face of the adapter poppet in the coupled relation of the coupler and adapter.

20. A dry disconnect coupler as in claim 17 wherein
the annular groove has a dovetail cross section, and
the sealing ring has an arch cross section having curved legs joined at an apex, said sealing ring being captured in said groove by the curved legs which extend beneath undercut portions of the groove with the apex projecting outwardly of the end face of the said coupler poppet when the coupler is not coupled to an adapter,
said sealing ring resiliently and sealingly engaging the walls of the dovetail groove and the end face of the adapter poppet in the coupled relation of the coupler and adapter.

21. A dry disconnect coupler as in claim 17 wherein
the face sealing means define the outer periphery of the coupler poppet.

22. A dry disconnect coupler as in claim 21 wherein
the periphery of said coupler poppet is relieved to form an annular seat, and the face sealing means comprises an elastomeric sealing ring bonded on said annular seat,
said sealing ring having a rectangular cross section and projecting outwardly of the end face of the coupler poppet when the coupler and adapter are uncoupled,
said sealing ring resiliently and sealingly engaging said annular seat and the end face of the adapter poppet in the coupled relation of the coupler and adapter.

23. A dry disconnect coupler as in claim 2 wherein
an annular groove is formed in the end face of the coupler poppet, and
the face sealing means comprise
an elastomeric sealing ring, having a generally rectangular cross section, bonded in said groove and sealingly engaging the end face of the adapter poppet when the adapter and coupler are locked in coupled relation.

24. A dry disconnect coupler as in claim 23 wherein
the sealing ring has an outer face and an annular rib projecting from the outer face for sealing engagement with the adapter poppet.

25. A dry disconnect coupler as in claim 24 wherein
the outer face of the sealing ring is disposed inwardly of the end face of coupler poppet and said annular rib projects outwardly of the end face of the coupler popper.

26. A dry disconnect coupler as in claim 24 wherein
said annular rib is in the form of a curved lip.

27. A dry disconnect coupler as in claim 16 wherein
an annular groove is formed in the end face of the coupler poppet, and
the face sealing means comprise
a sealing ring, mounted in said groove with the major portions thereof disposed inwardly of said coupler poppet, said sealing ring having a generally U-shaped cross section including first and second legs connected by a bridge,
further characterized in that
said legs project outwardly and
the first leg is generally parallel to the end face of the coupler poppet and bowed outwardly to project therebeyond for engagement with the end face of the adapter poppet.

28. A dry disconnect coupler as in claim 27 wherein
the sealing ring is formed of a polytetraflouroethylene resin and
further including a coil spring disposed between the legs of the sealing ring.

29. A dry disconnect coupler as in claim 28 further comprising
means for providing a seal between said sealing ring and said groove to prevent liquid from collecting in said groove.

30. A dry disconnect coupler as in claim 16 wherein
an annular groove is formed in the end face of the coupler poppet, and
the face sealing means comprise
an annular ring mounted in said groove for axial movement relative thereto,
spring means, disposed between said annular ring and the bottom of said groove, for yieldingly urging said annular ring outwardly of the end face of the coupler poppet,
said annular ring having, on its outer annular face, a layer of elastomeric material for sealing engagement with the end face of the adapter poppet.

31. A dry disconnect coupler as in claim 16 further comprising
an annular seal concentric of said coupler poppet and adapted to engage said adapter and provided a liquid seal therewith when the coupler is connected to an adapter.

32. A dry disconnect coupler as in claim 31 further comprising
an annular sealing ring having a T-shaped cross section, with the leg of the T extending inwardly,
said annular sealing ring being mounted on the coupler with an annular portion thereof providing the seal with the adapter and with the inwardly leg of the T providing the valve seat which is engaged by the coupler poppet in its closed position.

33. A dry disconnect coupler as in claim 32 wherein
the diameter of coupler poppet end face is slightly less than the diameter of the poppet of the adapter and
the face sealing means comprise
an elastomeric sealing ring mounted on the coupler poppet in close proximity to the outer periphery thereof.

* * * * *